United States Patent [19]
Iwashita et al.

[11] Patent Number: 6,096,279
[45] Date of Patent: Aug. 1, 2000

[54] FLUE GAS TREATING PROCESS AND SYSTEM

[75] Inventors: Koichiro Iwashita; Kazuaki Kimura; Toyoshi Nakagawa, all of Tokyo; Naohiko Ukawa; Susumu Okino, both of Hiroshima; Kiyoshi Okazoe, Tokyo, all of Japan

[73] Assignee: Mitsubishi Heavy Industries, Ltd., Tokyo, Japan

[21] Appl. No.: 09/033,894

[22] Filed: Mar. 3, 1998

[30]     Foreign Application Priority Data

Mar. 3, 1997  [JP]  Japan ................................. 9-063882
Jul. 16, 1997  [JP]  Japan ................................. 9-207254

[51] Int. Cl.$^7$ ................................................. B01D 53/50
[52] U.S. Cl. .................... 423/242.1; 423/243.01; 423/243.08; 423/244.01; 423/244.08; 423/555
[58] Field of Search ..................... 423/243.01, 244.01, 423/244.08, 242.1, 243.08, 555

[56]     References Cited

U.S. PATENT DOCUMENTS

| | | | |
|---|---|---|---|
| 4,696,804 | 9/1987 | Shinoda et al. | 423/242 |
| 5,246,680 | 9/1993 | Pikkujamsa | 423/244.07 |
| 5,470,556 | 11/1995 | Samish | 423/243.08 |
| 5,814,288 | 9/1998 | Madden et al. | 423/244.01 |

FOREIGN PATENT DOCUMENTS

| | | |
|---|---|---|
| 0 159 760 A2 | 10/1985 | European Pat. Off. . |
| 0 244 346 A2 | 11/1987 | European Pat. Off. . |
| 0 578 629 A1 | 1/1994 | European Pat. Off. . |
| 0 629 430 A1 | 12/1994 | European Pat. Off. .......... 423/244.08 |
| 225 349 A1 | 7/1985 | Germany ........................... 423/244.08 |
| 195 12 786 A1 | 11/1995 | Germany . |
| 50-71575 | 6/1975 | Japan ................................ 423/244.08 |
| 54-43874 | 4/1979 | Japan ................................ 423/244.08 |
| 4-176318 | 6/1992 | Japan ................................ 423/244.01 |
| 2288754 | 11/1995 | United Kingdom . |
| 96/17801 | 6/1996 | WIPO . |

*Primary Examiner*—Steven P. Griffin
*Assistant Examiner*—Timothy C Vanoy
*Attorney, Agent, or Firm*—Foley & Lardner

[57]     ABSTRACT

Flue gas is treated for the presence of $SO_3$, without resorting to ammonia injection, by adding a powder into the flue gas and subsequently bringing the flue gas into gas-liquid contact with an absorbing fluid, whereby the $SO_2$ present in the flue gas is removed by absorption into the absorbing fluid. The treatment process may also include introducing the flue gas into a dust collector, whereby dust, including the powder present in the flue gas, is collected, and/or recovering heat from the flue gas by means of a heat exchanger, whereby the flue gas is cooled. A system for treating flue gas is also provided.

8 Claims, 8 Drawing Sheets

FIG. 8
CONVENTIONAL

FLUE GAS TREATING PROCESS AND SYSTEM

FIELD OF THE INVENTION AND RELATED ART STATEMENT

This invention relates to a technique for the purification of flue gas containing $SO_2$ and $SO_3$ as sulfur oxides (e.g., flue gas produced from heavy oil-fired boilers). More particularly, it relates to a flue gas treating technique wherein a countermeasure against $SO_3$ present in flue gas which may condense to produce harmful sulfuric acid fumes can be achieved at low cost and with simple operation or equipment construction.

Generally, flue gas produced, for example, from a heavy oil-fired boiler in a thermal electric power plant or the like contains sulfur oxides, which include $SO_3$ (sulfur trioxide) in addition to $SO_2$ (sulfur dioxide). The proportion of $SO_3$ to the total amount of sulfur oxides (e.g., 1,500 ppm) may vary according to the combustion temperature of the boiler, the type of the burner, the type of the combustion catalyst, and the like, but is of the order of several percent in any event. That is, $SO_3$ is present in a relatively small amount, for example, of about 30 ppm. Consequently, an important basic consideration in the desulfurization of this type of flue gas is the capability to absorb $SO_2$.

However, when $SO_3$ present in flue gas produces fumes, they form harmful $H_2SO_4$ mists which are strongly corrosive and constitute a factor in scale formation. Moreover, they consist of submicron particles which can hardly be captured by mere gas-liquid contact with the absorbing fluid. For this reason, some treatment for the removal of $SO_3$ is required in order to prevent the corrosion of the equipment and the formation of scale or in order to achieve a further purification of flue gas.

Accordingly, in a flue gas treating system for use, for example, with a heavy oil-fired boiler, it has conventionally been common practice to inject ammonia into flue gas at a position upstream of the equipment and thereby capture $SO_3$ present in the flue gas as ammonium sulfate [$(NH_4)_2SO_4$].

One example of such a conventional flue gas treating process and system is described below with reference to FIG. 8.

Figure 8:
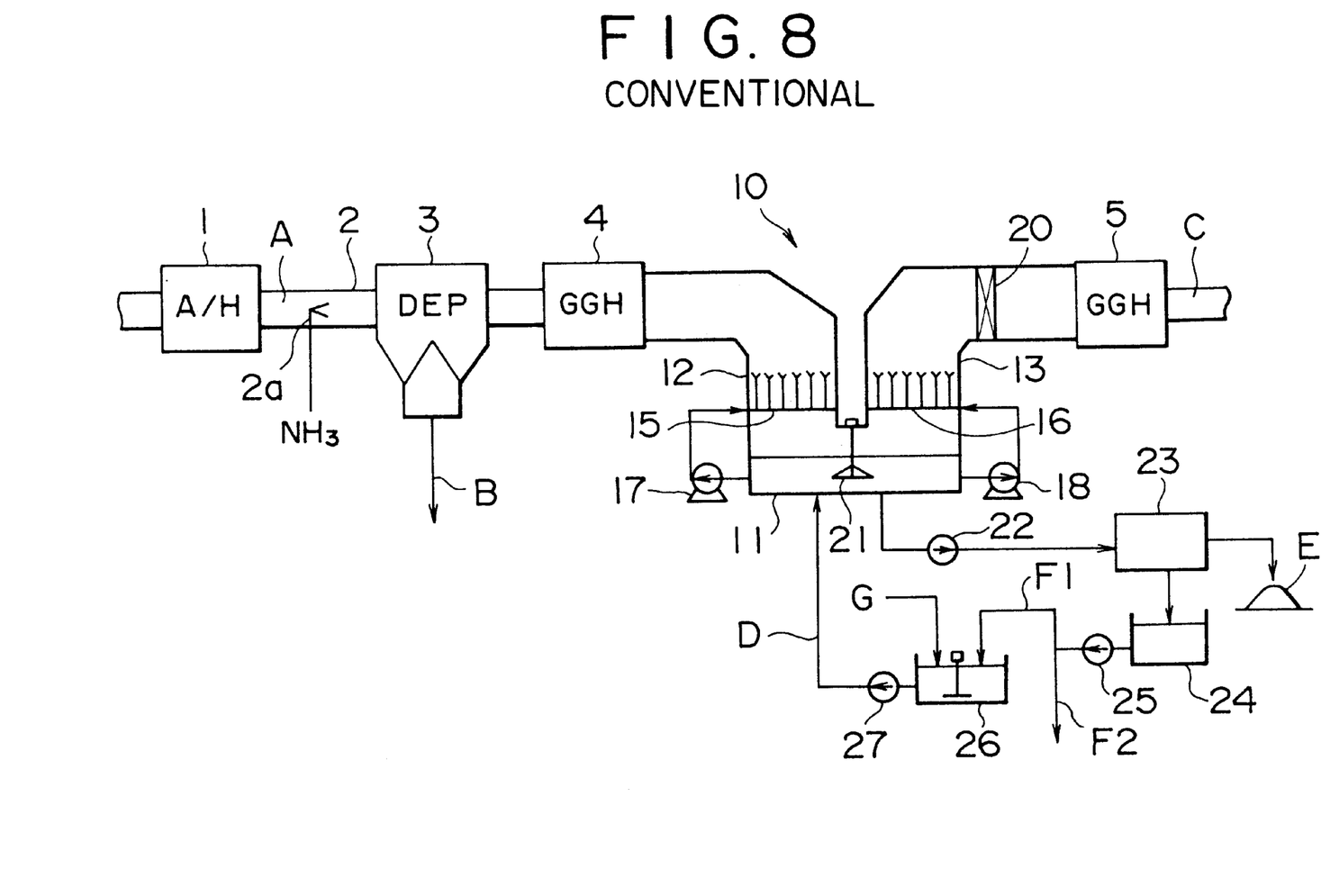
FIG. 8 is a schematic view illustrating the construction of a conventional flue gas treating system.

In FIG. 8, reference numeral 1 designates an air heater (boiler-side equipment) for heating combustion air to be supplied to a boiler (not shown) by utilizing the heat of exhaust gas. In this case, the apparatus or steps following this air heater 1 are within the scope of the present invention.

First, in an inlet duct 2, untreated flue gas A leaving air heater 1 is brought into contact with ammonia ($NH_3$) sprayed from a spray nozzle 2a. Thus, $SO_3$ present in the flue gas reacts with this ammonia and water in the flue gas to form ammonium sulfate.

Then, exhaust gas A is introduced into a dry electrostatic precipitator 3 where dust B such as fly ash is removed therefrom. This dust B consists essentially of unburned carbon and, in the case, for example, of heavy oil-fired boilers, further contains impurities such as vanadium and magnesium. Moreover, most of the aforesaid ammonium sulfate is also collected in this electrostatic precipitator 3, discharged in dust B, and disposed of, for example, as an industrial waste.

Thereafter, in order to heat treated flue gas C to be discharged into the atmosphere, in the reheating section 5 of a gas-gas heater (GGH) as will be described later, exhaust gas A is introduced into the heat recovery section 4 of this GGH where it is subjected to heat recovery and thereby cooled (heat recovery step). For example, the temperature of flue gas A is reduced from about 160° C. to about 100° C.

Subsequently, at least $SO_2$ and some of the remaining small amount of dust are removed from flue gas A in absorption towers 12 and 13 (which will be described later) of a desulfurization apparatus 10 (absorption step), heated in the reheating section 5 of GGH to a temperature suitable for discharge into the atmosphere, and then discharged from a stack (not shown) into the atmosphere as treated flue gas C.

The reheating section 5 may be omitted according to exhaust gas regulations, the height of a stack and so on.

In this process, desulfurization apparatus 10 has a construction in which two absorption towers 12 and 13 of the liquid column type (i.e., parallel-flow and counterflow absorption towers) are juxtaposed above a tank 11 for storing an absorbent slurry (or absorbing fluid) D and in which flue gas is successively introduced into these absorption towers and brought into gas-liquid contact with the slurry within tank 11 in the respective absorption towers. Each of absorption towers 12 and 13 is equipped with a plurality of spray pipes 15 and 16. Slurry sucked up by circulating pumps 17 and 18 is injected upward from these spray pipes 15 and 16 in the form of liquid columns. Moreover, a mist eliminator 20 for collecting and removing entrained mists is installed downstream of the absorption towers. The mist collected by this mist eliminator 20 is accumulated in a lower hopper (not shown) and returned to tank 11 through a drain pipe extending from the bottom of the hopper.

Moreover, this apparatus is equipped with a so-called rotating-arm air sparger 21 for blowing oxidizing air into the slurry within tank 11 in the form of fine air bubbles while agitating the slurry, so that the absorbent slurry having sulfur dioxide absorbed therein is brought into efficient contact with the air in tank 11 and thereby completely oxidized to form gypsum.

More specifically, in this apparatus, the absorbent slurry injected from spray pipes 15 or 16 within absorption tower 12 or 13 flows downward while absorbing sulfur dioxide and dust as a result of gas-liquid contact with flue gas, and enters tank 11 where it is oxidized by contact with a large number of air bubbles blown thereinto while being agitated with air sparger 21, and then undergoes a neutralization reaction to form gypsum. The dominant reactions occurring in the course of these treatments are represented by the following reaction formulas (1) to (3).

(Flue Gas Inlet Section of Absorption Tower)

$$SO_2 + H_2O \rightarrow H^+ + HSO_3^- \tag{1}$$

(Tank)

$$H^+ + HSO_3^- + \tfrac{1}{2}O_2 \rightarrow 2H^+ + SO_4^{2-} \tag{2}$$

$$2H^+ + SO_4^{2-} + CaCO_3 + H_2O \rightarrow CaSO_4 \cdot 2H_2O + CO_2 \tag{3}$$

Thus, gypsum, a small amount of limestone (used as the absorbent), and a slight amount of dust are steadily suspended in the slurry within tank 11. In this process, the slurry within tank 11 is withdrawn and fed to a solid-liquid separator 23 by means of a slurry pump 22. This slurry is filtered in solid-liquid separator 23, so that gypsum E having a low water content is recovered. On the other hand, a portion F1 of the filtrate from solid-liquid separator 23 is fed to a slurry preparation tank 26 by way of a filtrate tank 24 and a filtrate pump 25, and reused as water constituting absorbent slurry D.

Slurry preparation tank 26 is equipped with a stirrer and serves to prepare absorbent slurry D by mixing limestone G introduced from a silo (not shown) with the water fed from filtrate tank 24. Absorbent slurry D within slurry preparation tank 26 is suitably fed to tank 11 by means of a slurry pump 27. In order to make up for the water gradually lost, for example, owing to evaporation in absorption tower 12 and 13, make-up water (such as industrial water) is suitably supplied, for example, to tank 11. Limestone G is used in the form of a powder usually obtained by pulverizing quarried limestone to a particle diameter of about 100 $\mu$m.

Furthermore, in order to prevent the accumulation of impurities in the water circulating through desulfurization apparatus 10, the remainder of the filtrate within filtrate tank 24 is transferred to a waste water disposal process (not shown) as so-called desulfurization waste water F2.

According to the above-described flue gas treating process, the flue gas leaving electrostatic precipitator 3 contains little $SO_3$ and, therefore, the above-described disadvantages are avoided.

That is, if it were hot for ammonia injection for treating $SO_3$, this $SO_3$ would condense in the equipment on the basis of the dew point of sulfuric acid and thereby produce fumes as described above. Generally, most of the $SO_3$ would condense into fumes as a result of cooling in the heat recovery section 4 of GGH.

Consequently, in at least the heat recovery section 4 of GGH and the parts positioned downstream thereof, troubles such as the choking of the flue gas flow path due to the corrosion of equipment components or the formation of scale may arise, thus causing an increase in equipment cost and maintenance cost. Moreover, since such $SO_3$ fumes remain in the treated flue gas C discharged from desulfurization apparatus 10, a wet dust collector needs to be installed, for example, at a position downstream of absorption tower 13 and upstream of the reheating section 5 of GGH in order to achieve a high degree of purification of the flue gas. This also causes an increase in the cost and size of the equipment.

However, if ammonia injection is performed as illustrated in FIG. 8, $SO_3$ present in flue gas is converted into ammonium sulfate at a position upstream of electrostatic precipitator 3 as described above, and the resulting ammonium sulfate is collected as dust B in electrostatic precipitator 3. Thus, the above-described problems with $SO_3$ are tentatively solved.

In flue gas treating systems for coal-fired boilers, a system in which the heat recovery section 4 of GGH is disposed on the upstream side of electrostatic precipitator 3 to carry out the heat recovery step prior to electrostatic dust collection (i.e., the so-called high-performance system) is widely employed. This system is intended to achieve high dedusting performance with simple and small-sized equipment construction by focusing attention on the fact that, when the temperature of flue gas is low, the dust collection performance per unit capacity of the electrostatic precipitator is improved on the basis of the resistivity of dust. But, in cases where oil fuels are used, this system has few merits owing to differences in the properties (e.g., electrical resistance) of dust present in flue gas. Accordingly, it is common practice to perform the aforesaid ammonia injection by employing an equipment construction as illustrated in FIG. 8.

However, the above-described conventional flue gas treating process or system involves the following various problems due to the aforesaid ammonia injection.

First of all, it is no necessary to purchase expensive ammonia and supply it. This is disadvantageous from the viewpoint of operating cost.

Moreover, it is also necessary to lengthen inlet duct 2 so that ammonia may be injected and diffused. This interferes with a reduction in the size of the equipment.

Moreover, since some ammonia remains on the downstream side of electrostatic precipitator 3, nitrogen components are contained in desulfurization waste water F2. Consequently, a troublesome treatment for the removal of nitrogen, for example, by microbial denitrification is required prior to the disposal of the desulfurization waste water. This also causes an increase in operating cost and equipment size.

Moreover, ammonia is also contained in treated flue gas C and discharged into the atmosphere. Ammonia emission is not yet regulated in Japan, but it is undesirable from the viewpoint of further purification of flue gas. If it is regulated in the future, some measure for the removal of ammonia (e.g., the use of additional equipment) will be required. This will also pose a problem from the viewpoint of cost and the like.

Furthermore, ammonia is also contained in gypsum E formed as a by-product. Accordingly, depending on acceptance standards for gypsum, it may be necessary to wash the gypsum for the purpose of remove an offensive odor and the like.

In addition, ammonium sulfate dust remaining on the downstream side of elect rostatic precipitator 3 has a relatively small particle diameter and is not fully captured by gas-liquid contact in absorption towers 12 and 13. Consequently, such ammonium sulfate dust remains in treated flue gas C and also poses a problem from the viewpoint of further purification of flue gas.

Thus, the conventional flue gas treating technique is unsatisfactory for use as a technique for the purification of flue gas in which increasingly higher performance has recently come to be desired from qualitative and quantitative points of view and, in particular, as a simple and low-cost flue gas treating technique for small-scale electric power plants and independent electric power plants which are being popularized in recent years. Consequently, there is a need for further improvement in this flue gas treating technique.

Accordingly, the first object of the present invention is to provide a flue gas treating process and system in which a countermeasure against $SO_3$ present in flue gas can be easily achieved without ammonia injection and the flue gas can further be purified without the disadvantage of causing the injected substance to remain in the treated flue gas.

The second object of the present invention is to provide a flue gas treating process and system in which a countermeasure against $SO_3$ present in flue gas and a further purification of flue gap can be easily and fully achieved with simpler operation or equipment construction.

The third object of the present invention is to employ the lime-gypsum method in the absorption step for removing $SO_2$ and the like from flue gas while maintaining the purity of gypsum formed as a by-product at a high level or decreasing the amount of industrial waste discharged.

In order to accomplish the above-described objects, the present inventors carried out intensive investigations and discovered the empirical fact that, even if ammonia injection is not performed, the above-described problems with $SO_3$ will not arise in flue gas treating systems for exclusive coal-fired boilers. The reason for this has been found to be that flue gas produced from exclusive coal-fired boilers contains a large amount of dust such as fly ash (i.e., its content is 10 to 100 times higher as compared with flue gas from oil-fired boilers).

That is, according to investigations made by the present inventors, it is believed that, when a powder such as fly ash is contained in flue gas, the condensation, if ever, of $SO_3$ present in the flue gas as a result of cooling in the heat recovery step section 4 of GGH occurs only on the particle surfaces of the aforesaid powder and, therefore, $H_2SO_4$ particles formed by the condensation of $SO_3$ exist in a state bound to the particles of the aforesaid powder, resulting in no production of harmful fumes (or sulfuric acid mists). Moreover, it has been found by experience that, if flue gas contains a powder in such a proportion that the weight ratio (D/S) of the amount of powder (D) present in a unit volume of the flue gas to the amount of $SO_3$ (S) present in a unit volume of the flue gas is not less than about 2, the formation of scale and the corrosion of equipment components due to $SO_3$ hardly occurs.

The present invention, which has been completed on the basis of these findings, solves the above-described problems by means of the features described below.

According to the present invention, there is provided a flue gas treating process for the treatment of flue gas containing at least $SO_2$ and $SO_3$ which comprises a powder addition step for spraying a powder into the flue gas, and a subsequent absorption step for bringing the flue gas into gas-liquid contact with an absorbing fluid in an absorption tower, removing at least $SO_2$ present in the flue gas by absorption into the absorbing fluid and collecting the powder.

Also, according to the present invention, there is provided a flue gas treating process for the treatment of flue gas containing at least $SO_2$ and $SO_3$ which comprises a powder addition step for spraying a powder into the flue gas, a subsequent dust collection step for introducing the flue gas into a dust collector and collecting at least the powder present in the flue gas, and a subsequent absorption step for bringing the flue gas into gas-liquid contact with an absorbing fluid in an absorption tower and removing at least $SO_2$ present in the flue gas by absorption into the absorbing fluid.

Furthermore, according to the present invention, there is provided a flue gas treating process for the treatment of flue gas containing at least $SO_2$ and $SO_3$ which comprises a heat recovery step for recovering heat from the flue gas by means of a heat exchanger and thereby cooling the flue gas, and a subsequent absorption step for bringing the flue gas into gas-liquid contact with an absorbing fluid in an absorption tower and removing at least $SO_2$ present in the flue gas by absorption into the absorbing fluid, characterized in that a powder addition step for spraying a powder collectable in the absorption step into the flue gas is provided prior to the heat recovery step.

In the present invention, a powder addition step for spraying a powder collectable in an absorption tower or a dust collector into a flue gas is provided prior to the absorption step using the absorption tower or a dust collection step using the dust collector.

Consequently, even if $SO_3$ present in the flue gas condenses in or after this powder addition step, this condensation occurs only on the particle surfaces of the aforesaid powder. Consequently, $H_2SO_4$ particles formed by the condensation of $SO_3$ exist in a state bound to the particles of the aforesaid powder, resulting in a decrease in the production of harmful fumes (or sulfuric acid mists).

Moreover, since this powder is collected in the absorption step or the dust collection step, the $H_2SO_4$ particles are collected, together with the powder, in any of these steps. Consequently, none of thy powder and $H_2SO_4$ particles remain at least in the treated flue gas.

In the present invention, a powder addition step for spraying a powder collectable in the absorption step into the flue gas may be provided prior to the heat recovery step using a heat exchanger. Consequently, even if $SO_3$ present in the flue gas condenses in or after this powder addition step (e.g., as a result of cooling in the aforesaid heat recovery step), this condensation occurs only on the particle surfaces of the aforesaid powder. Consequently, $H_2SO_4$ particles formed by the condensation of $SO_3$ exist in a state bound to the particles of the aforesaid powder, resulting in a decrease in the production of harmful fumes (or sulfuric acid mists). Moreover, since this powder is collectable in the absorption tower, the aforesaid $H_2SO_4$ particles, together with the powder, are collected in the absorption tower. Consequently, none of the powder and $H_2SO_4$ particles remain at least in the treated flue gas.

Thus, according to the present invention, a countermeasure against $SO_3$ present in flue gas can be easily achieved without resorting to ammonia injection and the flue gas can further be purified without the disadvantage of causing the injected substance to remain in the treated flue gas.

Especially when the aforesaid powder is sprayed in such a proportion that the weight ratio (D/S) of the amount of dust (D) containing the aforesaid powder to the amount of $SO_3$ (S) present in the flue gas is not less than 2 (i.e., D/S $\geq$ 2), most of the condensation of $SO_3$ occurs on the particle surfaces of the aforesaid powder and the like. This makes it possible to avoid the production of harmful fumes (or sulfuric acid mists) with substantial certainty and prevent $SO_3$ from causing scale formation or corrosion with high reliability. As a result, ammonia injection can be completely eliminated to bring about the following practically favorable effects:

(1) The consumption of ammonia is reduced to zero, resulting in a marked saving in operating cost.

(2) The equipment for ammonia injection becomes unnecessary and the duct need not be specially lengthened in order to allow ammonia to diffuse, so that a corresponding reduction in equipment cost and equipment size can be achieved.

(3) Since no nitrogen component is contained in the desulfurization waste water, the necessity of a troublesome treatment for the removal of nitrogen is eliminated prior to the disposal of the desulfurization waste water. From this point of view, a reduction in equipment cost and equipment size can also be achieved.

(4) The amount of ammonia contained in the treated flue gas and discharged into the atmosphere is reduced to zero. This not only contributes greatly to a further purification of flue gas, but also makes it easy to cope with ammonia emission regulations in the future.

(5) When the lime-gypsum method is employed, the gypsum formed as a by-product contains no ammonia. Consequently, the gypsum need not be washed in order to remove an offensive odor and the like.

(6) Since no dust comprising sulfuric acid mists and ammonium sulfate dust remains in the treated flue gas as contrasted with the prior art, the overall dedusting performance of the system is improved without resorting a means such as a wet dust collector installed on the downstream side of the absorption tower. This also contributes to a further purification of flue gas.

Moreover, where the temperature of the powder sprayed into flue gas is lower than the temperature of the flue gas, $SO_3$ is allowed to condense more effectively on the particle surfaces of the powder. As a result, the production of harmful $SO_3$ mists can be prevented more satisfactorily and more easily.

Moreover, where the powder is suspended in a liquid to form a slurry and sprayed into flue gas, apparatus and devices conventionally used in a desulfurization system or the like, such as a stirred tank for the preparation of a slurry, slurry pumps, and nozzles for spraying the slurry, may be used without any modification. This is advantageous from the viewpoint of equipment cost and system operability. In addition, this makes it easier to disperse the powder uniformly in the flue gas as compared with pneumatic conveyance, so that troubles due to $SO_3$ can be prevented more efficiently.

Moreover, in this case, the particles of coal dust H are maintained at a lower temperature owing to the cooling effect caused by the evaporation of the liquid of the slurry into the flue gas (or the keeping cool effect caused by the presence of the liquid of the slurry). Consequently, the condensation of $SO_3$ on the particle surfaces of coal dust H is promoted, so that the $SO_3$-capturing function of coal dust H used as the powder is performed more satisfactorily.

Moreover, a high degree of purification of the flue gas can also be achieved when dust contained in the combustion exhaust gas of coal (i.e. coal dust) is used as the aforesaid powder. That is, since such coal dust has a relatively large particle diameter of the order of several tens of micrometers, it can be collected in the absorption tower with a relatively high degree of collection, as compared not only with conventionally encountered sulfuric acid mists but also with conventionally encountered ammonium sulfate dust. Consequently, little coal dust remains in the resulting treated flue gas.

Similarly to limestone, coal dust is a conventionally known material which has been familiarly handled in flue gas treating systems, and the existing equipment and handling techniques may be used without any modification. Thus, coal dust can be obtained and handled easily, resulting in a further saving in operating cost and equipment cost. In particular, coal dust is usually disposed of as an industrial waste in exclusive coal-fired electric power plants and the like, so that it can advantageously be obtained without any appreciable cost.

Also, when at least a part of the dust which has been collected in the dust collection step is used again as a powder sprayed into the flue gas, the following effects are produced in addition to the above-described basic effects.

In this case, the dust (comprising coal dust and the others) is recycled as the dust which collects $SO_3$. Consequently, the amount of the dust (comprising coal dust and the others) to be supplied newly can be decreased and the amount of the dust (comprising coal dust and the others) to be discharged out of the system can be decreased. Also, when the dust (comprising coal dust and the others) to be discharged out of the system is mixed with the gypsum formed according to the lime-gypsum method as will be described later, a unique effect in that the amount of dust can be minimized to maintain the purity of the gypsum at a high level is produced.

Furthermore, where a dust collection step for collecting dust present in the flue gas by means of a dry electrostatic precipitator is provided after the heat recovery step (the heat exchanger) and before the absorption step (the absorption tower), and at least a part of the dust collected in this dust collection step is reused as the aforesaid powder, the following unique effects are produced in addition to the above-described basic effects.

Specifically, in this case, the system represents a so-called high-performance system in which a heat exchanger is installed upstream of an electrostatic precipitator, so that the performance per unit capacity of the electrostatic precipitator is improved. Consequently, by using a small-sized electrostatic precipitator, the added coal dust can be removed from the flue gas with a high degree of collection. Moreover, dust originally contained in the untreated flue gas is also collected almost completely in this electrostatic precipitator and the absorption tower, and scarcely remains in the resulting treated flue gas.

Also in this case, therefore, scale formation and corrosion due to $SO_3$ are reliably prevented, for example, in the aforesaid heat exchanger and the ducts positioned downstream thereof and in the hopper of the electrostatic precipitator. Moreover, the same effects as the previously described effects (1) to (6) are produced.

Moreover, in this case, the powder (comprising coal dust and others) used to capture $SO_3$ is recycled. Consequently, the amount of fresh coal dust to be supplied can be decreased and the amount of dust (comprising coal dust and others) to be discharged out of the system can also be decreased. In addition, even where the dust (comprising coal dust and others) to be discharged out of the system is mixed with the gypsum formed according to the lime-gypsum method as will be described later, this has a unique effect in that the amount of dust mixed with the gypsum can be minimized to maintain the purity of the gypsum at a high level.

Furthermore, where at least a part of the dust collected in the dust collection step [i.e., the dust (comprising coal dust and others) to be discharged out of the system] is mixed with the gypsum formed as a by-product according to the lime-gypsum method, the amount of dust discharged as an industrial waste can be reduced to zero. This also contributes, for example, to a saving in operating cost.

Furthermore, where pulverized limestone is used as the aforesaid powder, the added limestone has a large particle diameter of the order of 100 $\mu$m and, therefore, can be collected in the absorption tower (or the absorption step) with a markedly high degree of collection, as compared not only with conventionally encountered sulfuric acid mists but also with conventionally encountered ammonium sulfate dust. Consequently, little limestone remains in the resulting treated flue gas. Thus, a particularly high degree of purification of flue gas can be achieved.

Furthermore, limestone is a conventionally known material which has been familiarly handled in flue gas treating systems, and the existing equipment and handling techniques may be used without any modification. Thus, limestone can be obtained and handled easily, resulting in a further saving in operating cost and equipment cost.

Limestone also has the advantage that its addition to flue gas exerts no adverse influence on the operation of the whole system. Specifically, in this case, the limestone collected in the absorption tower is dissolved or suspended in the absorbing fluid and acts as an absorbent (or alkaline agent) for neutralizing the absorbing fluid, thus promoting the sulfur oxide absorption reactions on the contrary.

Furthermore, where the lime-gypsum method in which limestone is used as an absorbent and gypsum is formed from the absorbed sulfur oxides is employed, the embodiment in which limestone is used as the powder and added to flue gas exerts no adverse influence on the purity of the gypsum, provided that the total amount of limestone added is controlled as usual. In addition, the added limestone is converted into useful gypsum without causing any increase in the amount of industrial waste.

Furthermore, where the absorption step for removing $SO_2$ and the like from flue gas is carried out according to the lime-gypsum method and the total amount of limestone required for use as the absorbent in this absorption step is added to flue gas as the aforesaid powder, the equipment conventionally used to feed limestone to the tank of the absorption tower, for example, by preparing a slurry thereof, becomes totally unnecessary. Thus, a further saving in equipment cost and the like can be achieved.

According to the present invention, there is provided a flue gas treating system for the treatment of flue gas containing at least $SO_2$ and $SO_3$ which comprises an absorption tower for bringing the flue gas into gas-liquid contact with an absorbing fluid and removing at least $SO_2$ present in the flue gas by absorption into the absorbing fluid, and a powder addition means for spraying a powder into the flue gas which is provided upstream of the absorption tower.

According to the present invention, there is also provided a flue gas treating system for the treatment of flue gas containing at least $SO_2$ and $SO_3$ which comprises a heat exchanger for recovering heat from the flue gas and thereby cooling the flue gas, and an absorption tower disposed downstream of the heat exchanger for bringing the flue gas into gas-liquid contact with an absorbing fluid and removing at least $SO_2$ present in the flue gas by absorption into the absorbing fluid, characterized in that powder addition means for spraying a powder into the flue gas is provided upstream of the heat exchanger.

In the flue gas treating system of the present invention, it is possible to employ an embodiment in which a dry electrostatic precipitator for collecting dust present in the flue gas containing the powder is provided downstream of the heat exchanger and upstream of the absorption tower, and at least a part of the dust collected by this electrostatic precipitator is reused as the powder.

DETAILED DESCRIPTION OF PREFERRED EMBODIMENTS

Several embodiments of the present invention will be described hereinbelow with reference to the accompanying drawings. The same elements as included in the conventional system of FIG. 8 are designated by the same reference numerals, and the explanation thereof is omitted.
(First Embodiment)

The first embodiment of the present invention is explained with reference to FIG. 1. This embodiment differs from the conventional flue gas treating system of FIG. 8 in that the ammonia injection step is omitted, a powder addition means (not shown) for spraying a powder into the flue gas is provided prior to the electrostatic precipitator 3, and a step for spraying a powder [e.g., dust contained in the combustion exhaust gas of coal (i.e., so-called coal dust H)] into flue gas A by using the powder addition means is provided prior to the dust collection step using the electrostatic precipitator 3.

As the aforesaid coal dust H, there may used, for example, coal dust collected by the electrostatic precipitators included in the flue gas treating system of an exclusive coal-fired electric power plant. Such coal dust is usually disposed of as an industrial waste and, therefore, can be very cheaply obtained substantially at the sole expense of transportation costs.

As the aforesaid powder addition means, any suitable means, for example, designed for pneumatic conveyance or slurry conveyance may be used. An example of a usable powder addition means designed for pneumatic conveyance is one consisting of a blower or air compressor and a pipeline for conveying the powder in a current of air, and a fixed nozzle for scattering and injecting the pneumatically conveyed powder into the flue gas duct. An example of a usable powder addition means designed for slurry conveyance is one consisting of a stirred tank for dispersing the powder in a liquid to form a slurry, a slurry pump for pressurizing and conveying the slurry formed in the stirred tank, and a fixed nozzle for scattering and injecting the pressurized and conveyed slurry into the flue gas duct.

Where the powder is sprayed in the form of a slurry, it is preferable that the liquid constituting the slurry be immediately evaporated by the heat of the flue gas so as to efficiently achieve the effect of capturing $SO_3$ on the particle surfaces of the powder. Common water (e.g., industrial water) is adequate for use as this liquid. Since the temperature of flue gas A is as high as about 160° C., the water in the spray slurry will be evaporated at once.

The solid content of the slurry may be of the same order as the solid content of the absorbent slurry in desulfurization apparatus 10 (e.g., about 20 to 30% by weight). Trial calculations made by the present inventors indicate that, even where the powder is sprayed in the form of a slurry, its amount may be slight relative to the flue gas as will be described later. Accordingly, the temperature of the flue gas will be reduced by only several degrees centigrade and hence exert no adverse influence on the subsequent heat recovery in GGH.

Even where coal dust H used as the powder is sprayed in the form of a slurry, Coal dust H may be added in such a proportion that the weight ratio (D/S) of the amount of powder (D) present in a unit volume of the flue gas to the amount of $SO_3$ (S) present in a unit volume of the flue gas satisfies the relation shown in FIG. 7 described later. For example, when it is necessary to increase the degree of the $SO_3$ removal up to about 70%, the value of D/S should not be less than 25. For example, when the $SO_3$ concentration is 50 mg/m³N, coal dust H should be used in such the amount that the amount of the powder including the dust in the flue gas is not less than 1250 mg/m³N.

For example, even where coal dust H used as the powder is sprayed in the form of a slurry, it may be added in such a low proportion that the weight ratio (D/S) of the amount of powder (D) present in a unit volume of the flue gas to the amount of $SO_3$ (S) present in a unit volume of the flue gas is, for example, not less than 2 (i.e., D/S≧2). For example, when the $SO_3$ concentration is 50 mg/m³N, coal dust H may be added in an amount of not less than 100 mg/m³N.

In this manner, the above-described effects of the powder are produced positively and satisfactorily, so that a countermeasure against $SO_3$ present in flue gas can be achieved at low cost and with simple operation or equipment construction without resorting to ammonia injection.

More specifically, even if $SO_3$ present in the flue gas condenses, for example, as a result of cooling in the heat recovery section 4 of GGH, most of this condensation occurs on the particle surfaces of the powder (comprising the aforesaid coal dust and others) present in the flue gas. Consequently, $H_2SO_4$ particles formed by the condensation of $SO_3$ exist in a state bound to the particles of the aforesaid powder, resulting in little production of harmful fumes (or sulfuric acid mists).

Moreover, since the added coal dust has a relatively large particle diameter of the order of 10 μm, most of it can be collected in an electrostatic precipitator 3 with a relatively high degree of collection, and the rest which has not been collected in the electrostatic precipitator 3 can be collected in absorption towers 12 and 13 of desulfurization apparatus 10 almost completely, as compared not only with conventionally encountered sulfuric acid mists but also with conventionally encountered ammonium sulfate dust. Consequently, little coal dust remains in the resulting treated flue gas C.

The coal dust collected in absorption towers 12 and 13 is dissolved or suspended in the circulating slurry, and is eventually contained in the gypsum E formed as a by-product. However, its content is as low as several percent and causes no problem in most cases. On the other hand, the sulfuric acid which has condensed on the surfaces of the coal dust and the like and has been collected in absorption towers 12 and 13 together with the coal dust and the like finally undergoes the previously described neutralization reaction (3) with limestone, for example, in tank 11 of the absorption tower to yield a part of the gypsum formed as a by-product.

In this embodiment, a part B1 of the dust (comprising the powder which has been sprayed into the flue gas and the dust present in the flue gas) which has been collected in a dust collection step using electrostatic precipitator 3 is recycled as a powder of the present invention to be sprayed into the flue gas. A part B1 of the dust which has been collected in electrostatic precipitator 3 is supplied into powder silo 30, is mixed with fresh coal dust H in powder silo 30, and then is sprayed at a position upstream of electrostatic precipitator 3 by the powder addition means again. Thus, a part B1 of the dust is recycled. In this embodiment, the dust such as fly ash which is contained in untreated flue gas A discharged from airheater 1 as well as coal dust H which is supplied from outside are included in the powder to be sprayed into the flue gas.

Also, in this embodiment, the other part B2 of the dust which has been collected by dry electrostatic precipitator 3 is mixed uniformly with gypsum E which has been produced as a by-product in desulfurization apparatus 10, and is discharged out of the system.

In this embodiment, it is preferable that the total amount of powder to be sprayed is such the required minimum amount as to satisfy the above-defined D/S ratio. Moreover, it is also preferable that the amount of dust B1 to be recycled is increased to its limit at which the sprayed powder has the ability to capture $SO_3$, and that the amounts of coal dust H to be added and dust B2 to be discharged is decreased to their required minimum levels. In this manner, the amount of dust B2 to be mixed with gypsum E can be minimized to maintain the purity of gypsum E at a high level, and the amount of coal dust H to be added can be decreased to facilitate the handling of coal dust H.

Thus, according to this embodiment, scale formation and corrosion due to $SO_3$ are reliably prevented in the heat recovery section 4 of GGH and the ducts positioned downstream thereof. Moreover, the following practically favorable effects (1) to (9) are produced.

(1) The consumption of ammonia is reduced to zero, resulting in a marked saving in operating cost.

(2) The equipment for ammonia injection becomes unnecessary and the duct need not be specially lengthened in order to allow ammonia to diffuse, so that a corresponding reduction in equipment cost and equipment size can be achieved.

(3) Since no nitrogen component is contained in the desulfurization waste water, the necessity of a troublesome treatment for the removal of nitrogen is eliminated prior to the disposal of desulfurization waste water F2. From this point of view, a reduction in equipment cost and equipment size can also be achieved.

(4) The amount of ammonia contained in the treated flue gas and discharged into the atmosphere is reduced to zero. This not only contributes greatly to a further purification of flue gas, but also makes it easy to cope with ammonia emission regulations in the future.

(5) The gypsum formed as a by-product contains no ammonia. Consequently, the gypsum need not be washed in order to remove an offensive odor and the like.

(6) Since no dust comprising sulfuric acid mists and ammonium sulfate dust remains in the treated flue gas as contrasted with the prior art, the overall dedusting performance of the system is improved without resorting a means such as a wet dust collector installed on the downstream side of the absorption tower. This also contributes to a further purification of flue gas.

(7) Where coal dust H used as the powder is sprayed in the form of a slurry, apparatus and devices conventionally used in a desulfurization system or the like, such as a stirred tank for the preparation of a slurry, slurry pumps, and nozzles for spraying the slurry, may be used without any modification. This is advantageous from the viewpoint of equipment cost and system operability. In addition, this makes it easier to disperse the powder uniformly in the flue gas as compared with pneumatic conveyance, so that troubles due to $SO_3$ can be prevented more efficiently.

Moreover, in this case, the particles of coal dust H are maintained at a lower temperature owing to the cooling effect caused by the evaporation of the liquid of the slurry into flue gas (or the keeping cool effect caused by the presence of the liquid of the slurry). Consequently, the condensation of $SO_3$ on the particle surfaces of coal dust H is promoted, so that the $SO_3$-capturing function of coal dust H used as the powder is performed more satisfactorily.

(8) In this embodiment, the dust comprising coal dust H which is used as a powder capable of collecting $SO_3$ is recycled. Consequently, this embodiment has unique effects in that the amount of fresh coal dust to be supplied can be descreased and in that the amount of dust B2 to be mixed with gypsum E can be minimized to improve the purity of gypsum E.

(9) In this embodiment, because dust B2 is mixed with gypsum E, the amount of dust to be discharged as industrial waste can be zero. Consequently, the cost of operation can be reduced. When the purity of gypsum is required to be higher, a part or all of dust B2 may not be mixed with gypsum E.

(Second Embodiment)

Figure 2:
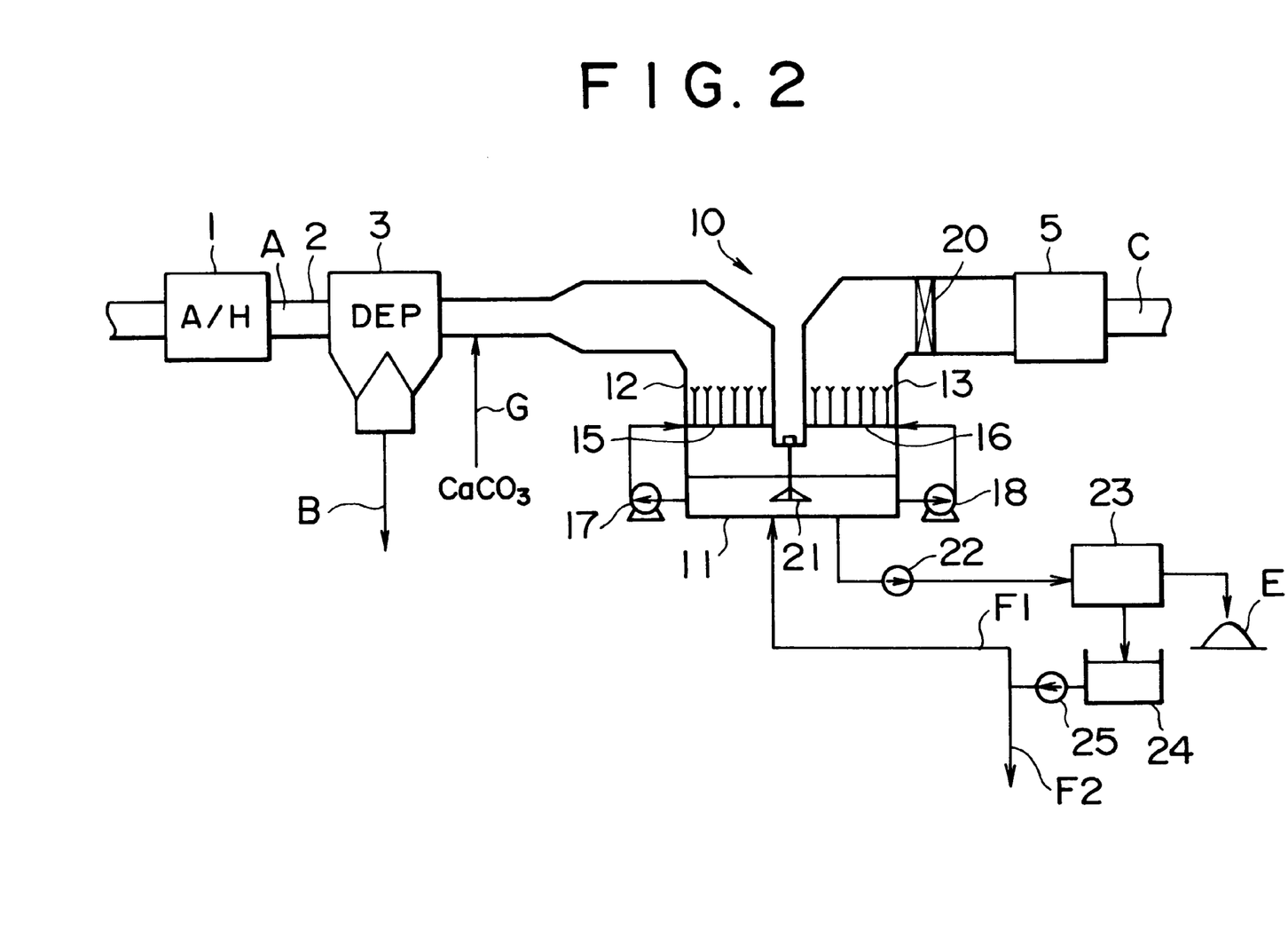
FIG. 2 is a schematic view illustrating the construction of a flue gas treating system in accordance with the second embodiment of the present invention.

Next, the second embodiment of the present invention is explained with reference to FIG. 2. In this embodiment, a powder addition means for spraying a powder at a position upstream of absorption towers 12 and 13 is installed, and a powder such as limestone G described above which is obtained by pulverizing limestone ($CaCO_3$) is sprayed into flue gas A as a powder of the present invention by the powder addition means.

Also, in this embodiment, pulverized coal dust may be sprayed into the flue gas by pneumatic conveyance, or may be sprayed in the form of a slurry.

Figure 1:
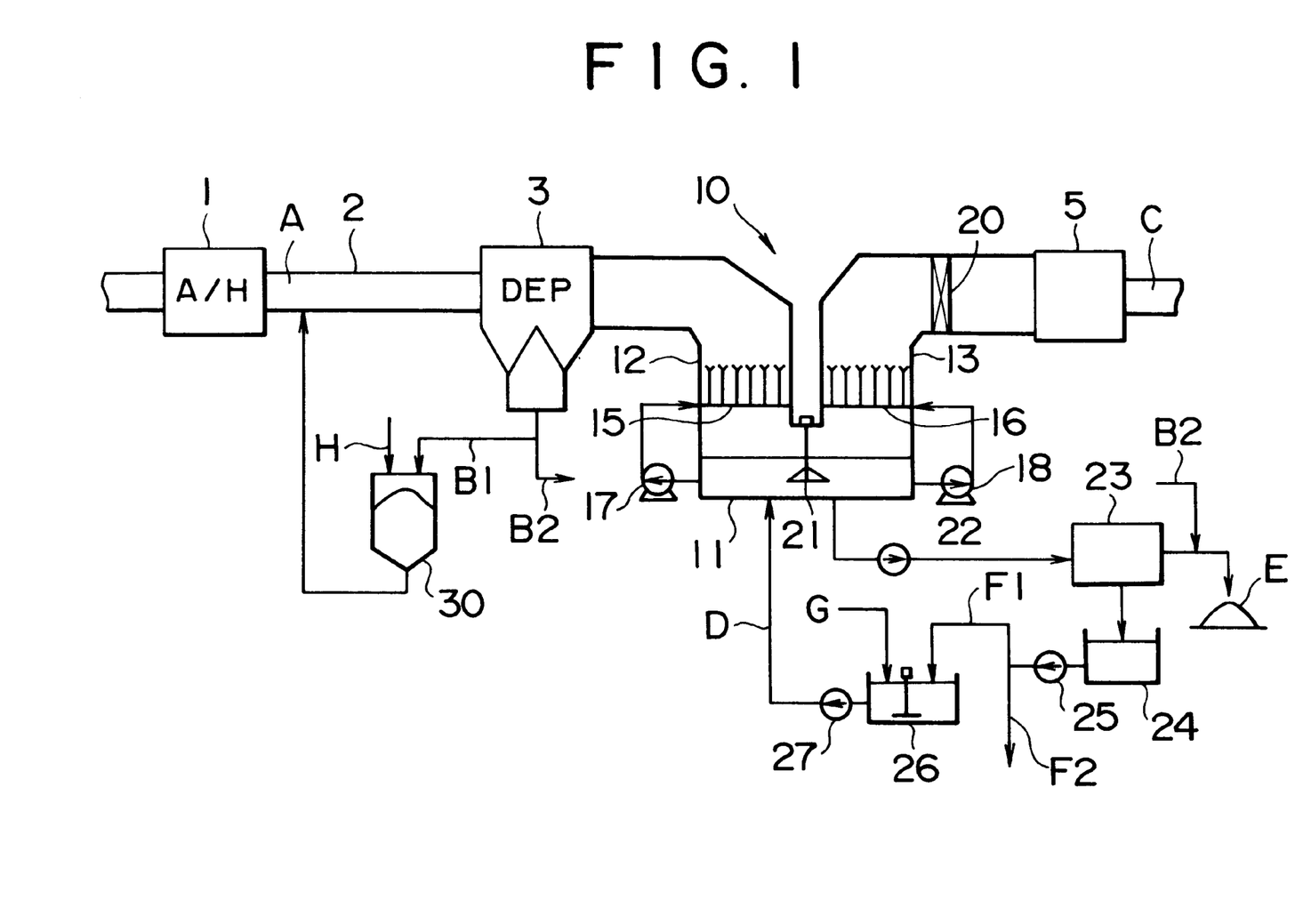
FIG. 1 is a schematic view illustrating the construction of a flue gas treating system in accordance with the first embodiment of the present invention.

Moreover, in this embodiment, slurry preparation tank 26 and slurry pump 27 shown in FIG. 1 are omitted, and filtrate F1 is returned directly to tank 11 of the absorption towers. The total amount of limestone required for use as the absorbent in the absorption step in desulfurization apparatus 10 and in the formation of gypsum is added to the flue gas as the aforesaid powder, so that the absorbent is indirectly supplied to the slurry within tank 11 of desulfurization apparatus 10.

In this case, the amount of limestone G required for use as the absorbent is basically in stoichiometric proportion to the amount of sulfur oxides present in the flue gas. When flue gas A comprises common combustion exhaust gas (e.g., flue gas produced from an oil fuel such as heavy oil), trial calculations made by the present inventors have revealed that the weight ratio (D/S) of the amount of powder (D) present in a unit volume of the flue gas to the amount of $SO_3$ (S) present in a unit volume of the flue gas is equal to about 28.

In this embodiment, therefore, the previously described effects of the powder are produced positively and satisfactorily, so that a countermeasure against $SO_3$ present in flue gas can be achieved at low cost and with simple operation or equipment construction without resorting to ammonia injection.

More specifically, even if $SO_3$ present in the flue gas condenses, most of this condensation occurs on the particle surfaces of the powder (comprising the aforesaid limestone and others) present in the flue gas. Consequently, $H_2SO_4$ particles formed by the condensation of $SO_3$ exist in a state bound to the particles of the aforesaid powder, resulting in little production of harmful fumes (or sulfuric acid mists).

Moreover, the added limestone has a large particle diameter of the order of 100 μm and, therefore, can be collected in absorption towers 12 and 13 of desulfurization apparatus 10 with a markedly high degree of collection, as compared not only with conventionally encountered sulfuric acid mists but also with conventionally encountered ammonium sulfate dust. Consequently, little limestone remains in the resulting treated flue gas C.

The limestone collected in absorption towers 12 and 13 is dissolved or suspended in the circulating slurry, and acts as the aforesaid absorbent (or alkaline agent) for neutralizing the slurry to form gypsum as a by-product. On the other hand, the sulfuric acid which has condensed on the surfaces of the limestone and the like and has been collected together with the limestone and the like finally undergoes the previously described neutralization reaction (3) with limestone, for example, in tank 11 of the absorption towers to yield a part of the gypsum formed as a by-product.

Also in this embodiment, therefore, scale formation and corrosion due to $SO_3$ are reliably prevented, and the same effects as the effects (1) to (7) previously described in connection with the first embodiment are produced.

Furthermore, in this embodiment, the total amount of limestone required for use in the absorption step in desulfurization apparatus 10 is supplied as the aforesaid powder, and conventionally used slurry preparation tank 26 and slurry pump 27 are omitted. Thus, this embodiment has a unique effect in that a further reduction in equipment cost and equipment size can be achieved.

(Third Embodiment)

Figure 3:
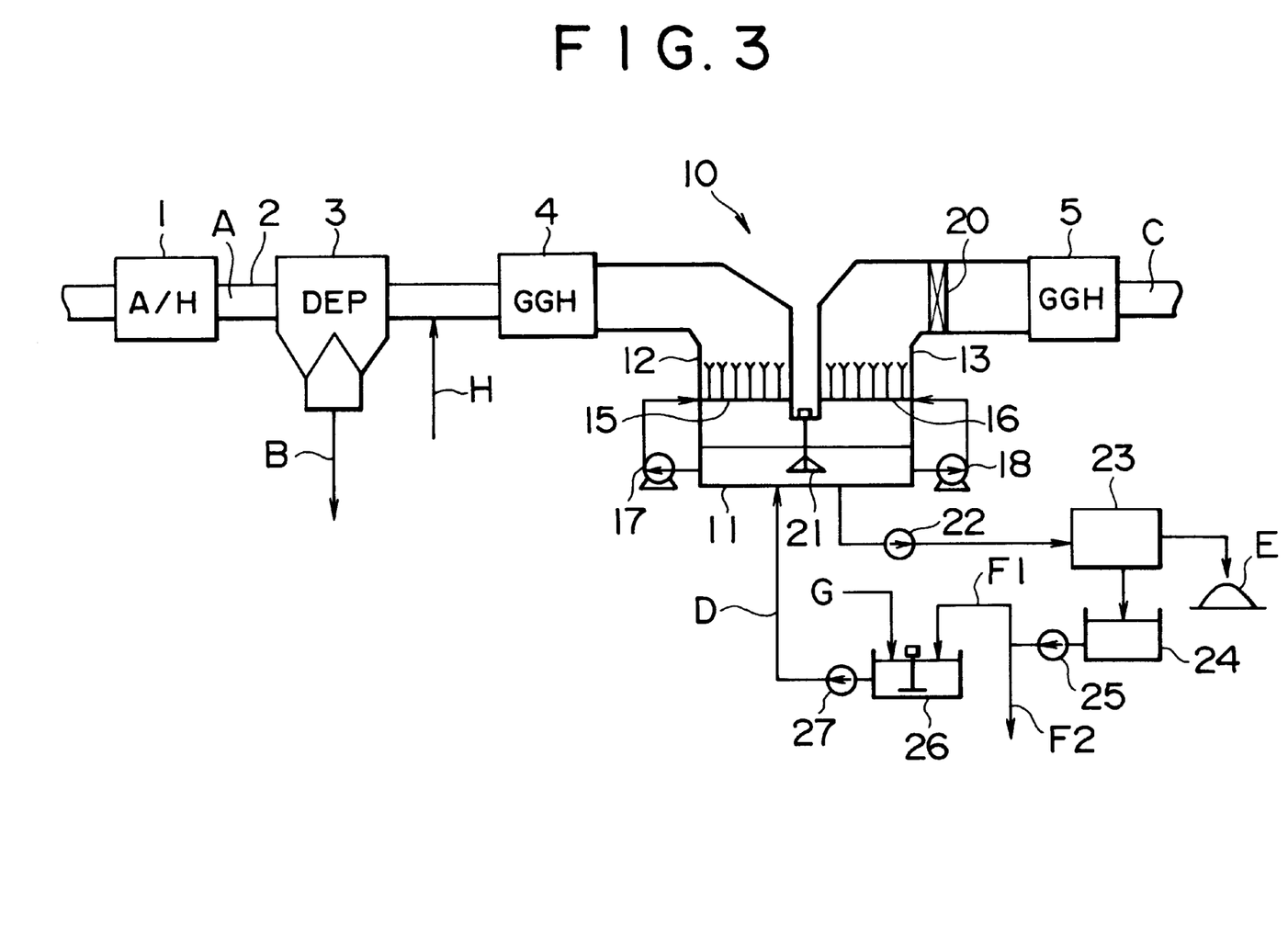
FIG. 3 is a schematic view illustrating the construction of a flue gas treating system in accordance with the third embodiment of the present invention.

The third embodiment of the present invention is explained with reference to FIG. 3. This embodiment differs from the conventional flue gas treating system of FIG. 8 in that the ammonia injection step is omitted and in that a powder addition means (not shown) for spraying a powder is installed at a position upstream of the heat recovery section 4 of GGH and a step for spraying a powder [e.g., dust contained in the combustion exhaust gas of coal (i.e., so-called coal dust H)] into flue gas A by using the aforesaid powder addition means is provided prior to the heat recovery step using the aforesaid heat recovery section 4.

The same effects as the effects (1) to (7) previously described in connection with the first embodiment are produced. In addition, the following effect (8) is also produced in this embodiment.

(8) The disposition and construction of dry electrostatic precipitator 3 and other apparatus and the construction of desulfurization apparatus 10 may be exactly the same as in the conventional system illustrated in FIG. 8, except for the means for adding coal dust H. Consequently, this embodiment has a unique effect in that the existing flue gas treating system can be very easily adapted for application of the present invention.

Figure 6:
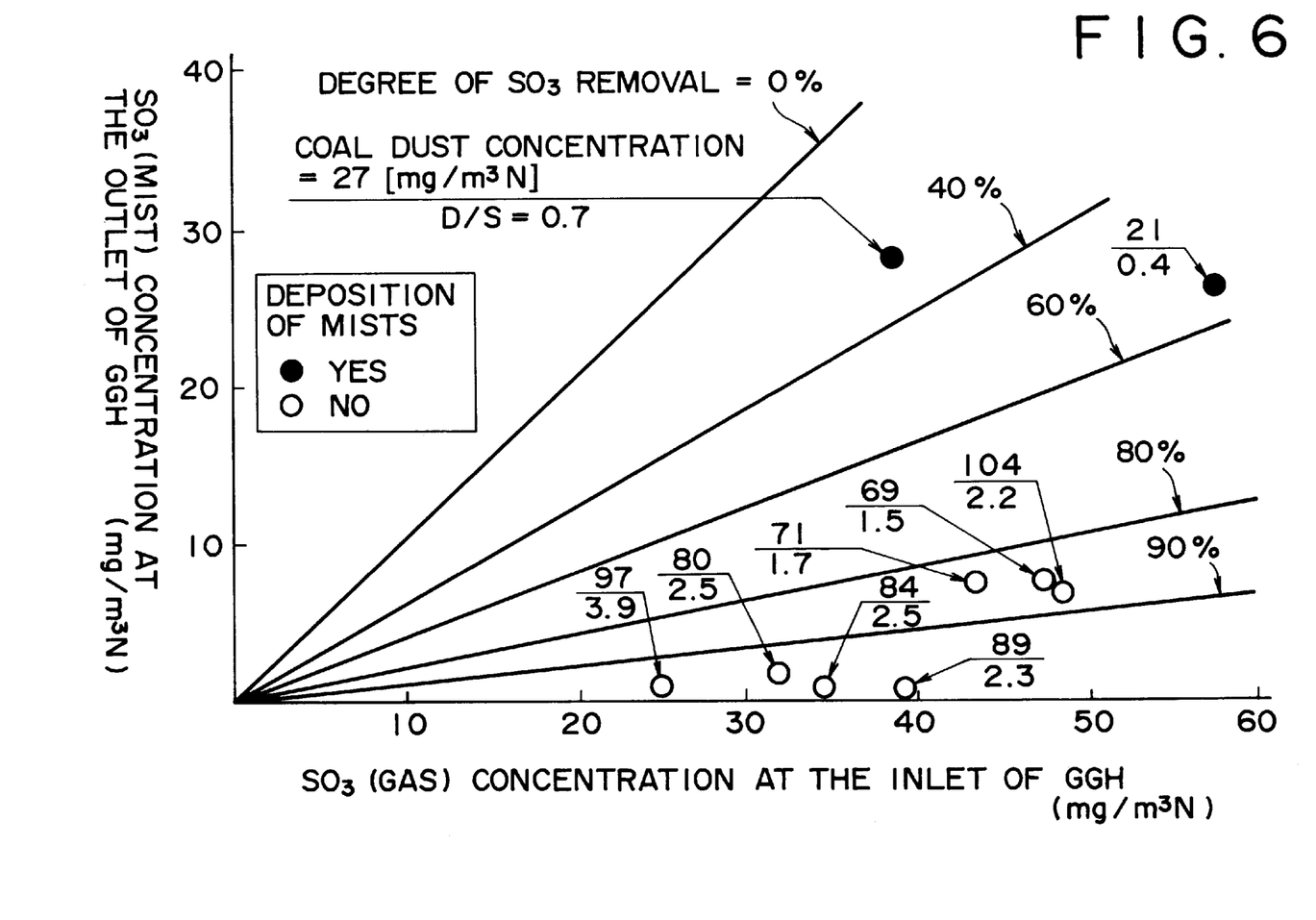
FIG. 6 is a graph showing data which demonstrate the principle of the present invention.

FIG. 6 shows actually measured data demonstrating the principle of the present invention (in particular, the addition of coal dust).

These data indicate the relationship between the $SO_3$ gas concentration at the inlet of GGH (or the inlet of the heat recovery section) and the $SO_3$ mist concentration at the outlet of GGH (or the outlet of the reheating section) (i.e., the degree of $SO_3$ removal) when the coal dust concentration in flue gas is used as a parameter. In FIG. 6, solid data points show actually measured data with which the deposition of sulfuric acid mists on the internal surfaces of apparatus such as heat recovery section 4 was observed with the naked eye, whereas open data points show actually measured data with which the deposition of sulfuric acid mists was not observed.

It can be seen from these data that about 90% of $SO_3$ was removed even at a D/S value of about 1.5, no deposition of $SO_3$ mists on the equipment surfaces was observed, and the amount of $SO_3$ mists remaining in the effluent flue gas was as small as about 10%. Accordingly, it is obvious that, if coal dust is added to flue gas, for example, in such a proportion that D/S is not less than about 2, $SO_3$ mists will be almost completely removed and will scarcely remain in the treated flue gas, and corrosion or scale formation due to the deposition of mists can be prevented with high reliability.

Since the above-described mist-removing effect of coal dust is a physical phenomenon in which $SO_3$ is allowed to condense on the surfaces of particles present in flue gas, powders other than coal dust (e.g., pulverized limestone) will produce similar effects.

(Fourth Embodiment)

Figure 4:
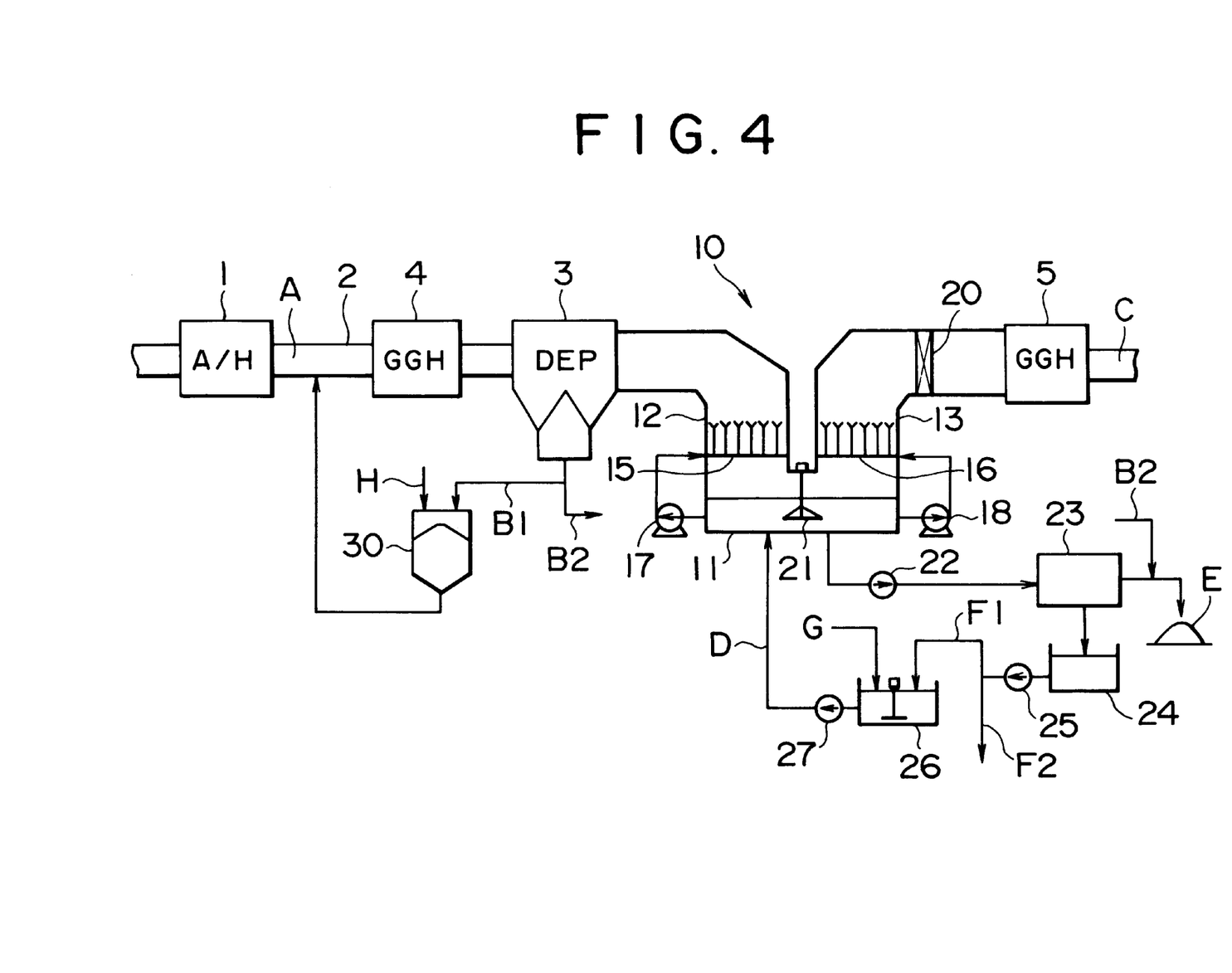
FIG. 4 is a schematic view illustrating the construction of a flue gas treating system in accordance with the fourth embodiment of the present invention.

Next, the fourth embodiment of the present invention is explained with reference to FIG. 4. Basically, this embodiment is similar to the third embodiment in that coal dust is used as the powder of the present invention and sprayed at a position upstream of the heat recovery section 4 of GGH. However, this embodiment is characterized in that dry electrostatic precipitator 3 is installed on the downstream side of heat recovery section 4 and a dust collection step for collecting dust present in the flue gas by means of this electrostatic precipitator 3 is provided after the heat recovery step using the aforesaid heat recovery section 4 and before the absorption step using desulfurization apparatus 10.

Also in this embodiment, coal dust may be sprayed into the flue gas by pneumatic conveyance, or may be sprayed in the form of a slurry.

Moreover, this embodiment is constructed in such a way that at least a part B1 of the dust collected in the dust collection step using electrostatic precipitator 3 is reused as the powder of the present invention which is sprayed at a position upstream of heat recovery section 4. Specifically, in this case, part B1 of the dust collected in electrostatic precipitator 3 is first fed to a powder silo 30 where fresh coal dust H is added thereto. Then, this dust is recycled by using the previously described powder addition means to spray it again at a position upstream of heat recovery section 4. In this embodiment, therefore, the powder sprayed at a position upstream of heat recovery section 4 contains, in addition to externally supplied coal dust H, dust (e.g., fly ash) originally present in untreated flue gas A leaving air heater 1.

Moreover, in this embodiment, the remainder B2 of the dust collected in dry electrostatic precipitator 3 is homogeneously mixed with gypsum E formed in desulfurization apparatus 10 as a by-product and discharged out of the system.

In this embodiment, it is preferable that the total amount of powder sprayed be the required minimum amount (e.g., such an amount as to cause the above-defined D/S ratio to have a value of about 2). Moreover, it is also preferable that the amount of dust B1 recycled be increased to its limit at which the sprayed powder has the ability to capture $SO_3$, and the amounts of fresh coal dust H added and dust B2 discharged be decreased to their required minimum levels. In this manner, the amount of dust B2 mixed with gypsum E can be minimized to maintain the purity of gypsum E at a high level, and the amount of fresh coal dust H added can be decreased to facilitate the handling of coal dust H.

Also in this embodiment, the previously described effects of the powder are positively and satisfactorily produced in the same manner as in the third embodiment, so that a countermeasure against $SO_3$ present in flue gas can be achieved at low cost and with simple operation or equipment construction without resorting to ammonia injection.

Moreover, the system of this embodiment represents the previously described high-performance system in which heat recovery section 4 is installed upstream of electrostatic precipitator 3, so that the performance per unit capacity of electrostatic precipitator 3 is improved. Consequently, by using a small-sized electrostatic precipitator 3, the added coal dust H can be removed from the flue gas with a high degree of collection. In addition, dust originally contained in untreated flue gas A is also collected almost completely in this electrostatic precipitator 3 and the absorption towers 12 and 13 of desulfurization apparatus 10, and scarcely remains in the resulting treated flue gas C.

Also in this embodiment, therefore, scale formation and corrosion due to $SO_3$ are reliably prevented, for example, in the heat recovery section 4 of GGH and the ducts positioned downstream thereof and in the hopper of electrostatic precipitator 3. Moreover, the same effects as the effects (1) to (7) previously described in connection with the first embodiment are produced.

Furthermore, in this embodiment, the powder (comprising coal dust H and others) used to capture $SO_3$ is recycled. This has a unique effect in that the amount of fresh coal dust H supplied can be decreased and, moreover, the amount of dust B2 mixed with gypsum E can be minimized to maintain the purity of gypsum E at a high level.

Furthermore, since dust B2 is mixed with gypsum E, the amount of dust discharged as an industrial waste can be reduced to zero. This also contributes, for example, to a saving in operating cost.

It goes without saying that, if gypsum having a higher purity is desired, all or part of dust B2 may not be mixed with gypsum E.

(Fifth Embodiment)

Figure 5:
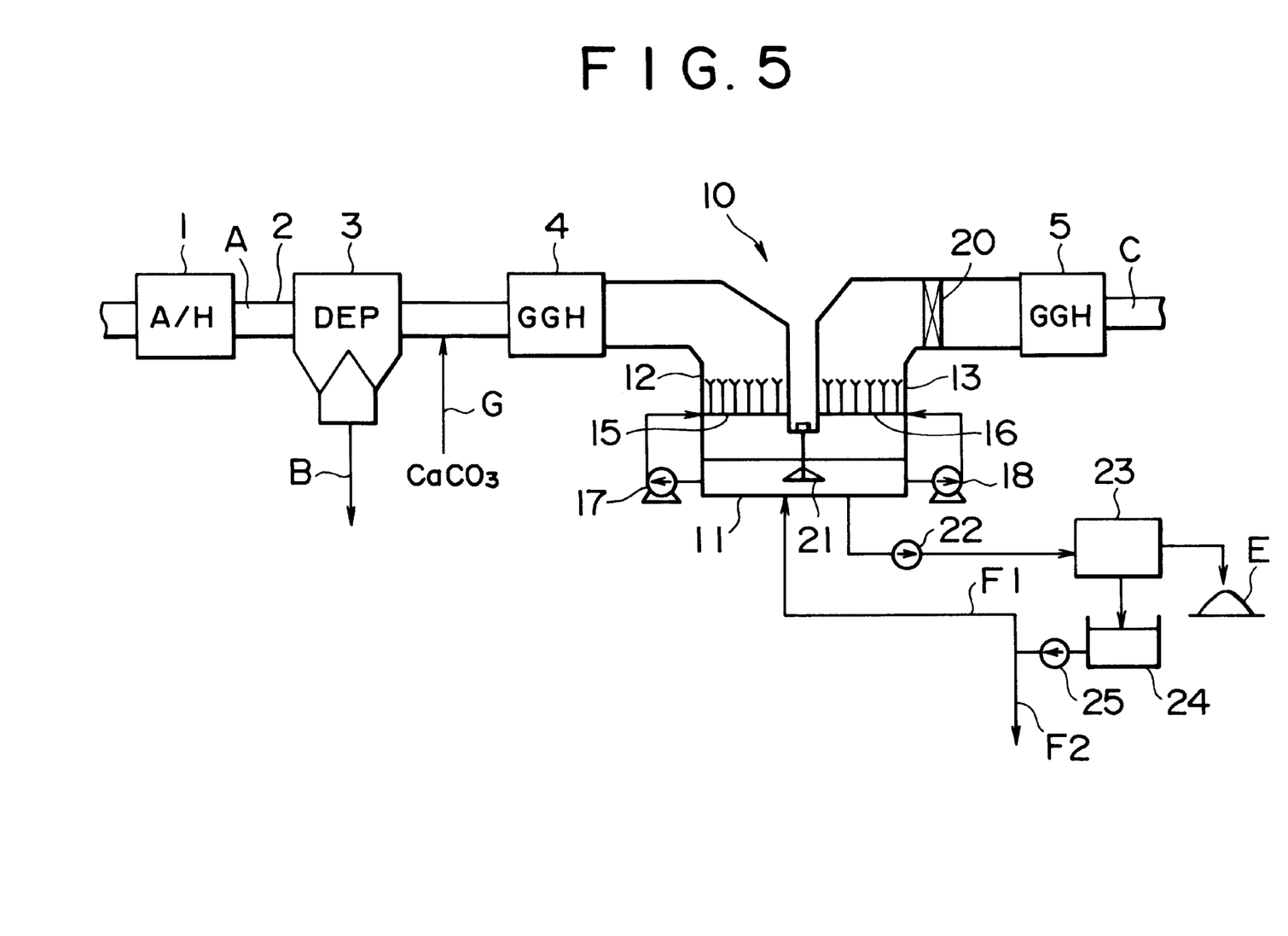
FIG. 5 is a schematic view illustrating the construction of a flue gas treating system in accordance with the fifth embodiment of the present invention.

Next, the fifth embodiment of the present invention is explained with reference to FIG. 5. This embodiment is similar to the third embodiment in that a powder addition means for spraying a powder is installed at a position upstream of the heat recovery section 4 of GGH and, by using this powder addition means, a powder prepared by pulverizing limestone ($CaCO_3$) (e.g., the aforesaid limestone G) is sprayed into flue gas A as the powder of the present invention.

Also in this embodiment, pulverized limestone may be sprayed into the flue gas by pneumatic conveyance, or may be sprayed in the form of a slurry.

Moreover, in this embodiment, slurry preparation tank 26 and slurry pump 27 shown in FIG. 8 are omitted and filtrate F1 is returned directly to tank 11 of the absorption towers. The total amount of limestone required for use as the absorbent in the absorption step in desulfurization apparatus 10 and in the formation of gypsum is added to the flue gas as the aforesaid powder at a position upstream of heat recovery section 4, so that the absorbent is indirectly supplied to the slurry within tank 11 of desulfurization apparatus 10.

In this case, the amount of limestone G required for use as the absorbent is basically in stoichiometric proportion to the amount of sulfur oxides present in the flue gas. When flue gas A comprises common combustion exhaust gas (e.g., flue gas produced from an oil fuel such as heavy oil), trial calculations made by the present inventors have revealed that the weight ratio (D/S) of the amount of powder (D) present in a unit volume of the flue gas to the amount of $SO_3$ (S) present in a unit volume of the flue gas is equal to about 28.

In this embodiment, therefore, the previously described effects of the powder are produced positively and satisfactorily, so that a countermeasure against $SO_3$ present in flue gas can be achieved at low cost and with simple operation or equipment construction without resorting to ammonia injection.

More specifically, even if $SO_3$ present in the flue gas condenses, for example, as a result of cooling in the heat recovery section 4 of GGH, most of this condensation occurs on the particle surfaces of the powder (comprising the aforesaid limestone and others) present in the flue gas. Consequently, $H_2SO_4$ particles formed by the condensation of $SO_3$ exist in a state bound to the particles of the aforesaid powder, resulting in little production of harmful fumes (or sulfuric acid mists).

Moreover, the added limestone has a large particle diameter of the order of 100 μm and, therefore, can be collected in absorption towers 12 and 13 of desulfurization apparatus 10 with a markedly high degree of collection, as compared not only with conventionally encountered sulfuric acid mists but also with conventionally encountered ammonium sulfate dust. Consequently, little limestone remains in the resulting treated flue gas C.

The limestone collected in absorption towers 12 and 13 is dissolved or suspended in the circulating slurry, and acts as the aforesaid absorbent (or alkaline agent) for neutralizing the slurry to form gypsum as a by-product. On the other hand, the sulfuric acid which has condensed on the surfaces of the limestone and the like and has been collected together with the limestone and the like finally undergoes the previously described neutralization reaction (3) with limestone, for example, in tank 11 of the absorption towers to yield a part of the gypsum formed as a by-product.

Also in this embodiment, therefore, scale formation and corrosion due to $SO_3$ are reliably prevented, for example, in the heat recovery section 4 of GGH and the ducts positioned downstream thereof. Moreover, the same effects as the effects (1) to (7) previously described in connection with the first embodiment are produced.

Furthermore, in this embodiment, the total amount of limestone required for use in the absorption step in desulfurization apparatus 10 is supplied as the aforesaid powder, and conventionally used slurry preparation tank 26 and slurry pump 27 are omitted. Thus, this embodiment has a unique effect in that a further reduction in equipment cost and equipment size can be achieved.

Figure 7:
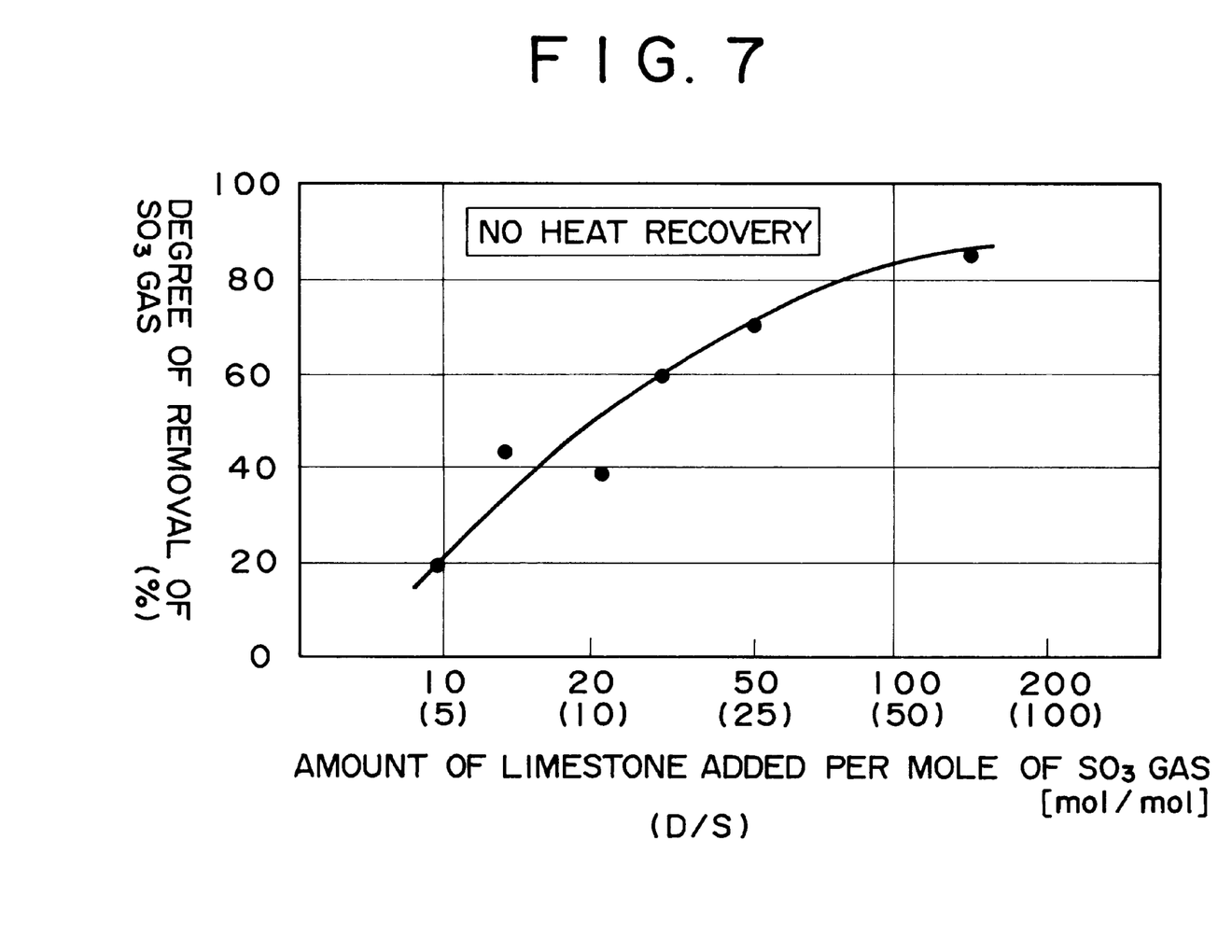
FIG. 7 is a graph showing other data which demonstrate the principle of the present invention.

FIG. 7 shows actually measured data demonstrating the principle of the present invention (in particular, the addition of limestone).

These data indicate the relationship between the amount of limestone added and th proportion of $SO_3$ removed by condensation on the particle surfaces of the limestone when a slurry composed of powered limestone and water (with a concentration of about 20–30% by weight) was simply sprayed into flue gas containing about 3.7–11.5 ppm of $SO_3$ and no subsequent heat recovery from the flue gas was performed. These data reveals that $SO_3$ can be effectively removed simply by spraying a slurry of limestone into flue gas. Consequently, it can be seen that, according to the principle of the present invention in which heat recovery is performed after the addition of a powder so as to allow $SO_3$ to condense positively, a high degree of $SO_3$ removal can be achieved even at a low D/S value.

It is to be understood that the present invention is not limited to the above-described embodiments, but may also be practiced in various other ways. For example, the powder of the present invention is not limited to limestone and coal dust, but there may be used any powder that allows $SO_3$ to condense on the particle surfaces thereof and can be collected in a common electrostatic precipitator or the absorption tower of a desulfurization apparatus. However, to the aforesaid limestone and coal dust are conventionally known materials which have been familiarly handled in flue gas treating systems, and the existing equipment and handling techniques may be used without any modification. Thus, they have the advantages that they can be obtained and handled easily, and that they exert no adverse influence on the operation of the whole system and, on the contrary, the trouble of supplying limestone to the tank of the absorption tower can be saved as described previously.

Moreover, in order to promote the condensation of $SO_3$ on the particle surfaces of the powder, a powder (or a slurry thereof) having a temperature lower than that of flue gas [e.g., a powder (or a slurry thereof) which has been forcedly cooled as required] may be sprayed into the flue gas. This allows $SO_3$ to condense more effectively on the particle surfaces of the powder, so that the production of harmful $SO_3$ mists can be prevented more satisfactorily and more easily.

Moreover, the powder of the present invention may comprise both limestone and coal dust, and they may be added in admixture or separately. Even where limestone alone is used, it may be added in such a way that only the part thereof required to capture $SO_3$ is sprayed into flue gas and the remainder is supplied directly to the tank of the absorption tower of the desulfurization apparatus as usual.

Also, in the first embodiment, instead of recycling the dust comprising a powder which has been collected in electrostatic precipitator 3 as a powder of the present invention, all the dust may be discharged as industrial waste as usual.

Furthermore, it goes without saying that the construction of the absorption step or absorption tower of the present invention is not limited to the above-described embodiments. For example, the absorption tower may comprise a single absorption tower, and various types of absorption towers (or gas-liquid contact apparatus) including packed tower, spray tower and bubbling tower types may be employed. In addition, the present invention is not limited to the use of a calcium compound (e.g., limestone) as the absorbent, but a desulfurization process using, for example, sodium hydroxide or magnesium hydroxid may also be employed.

Although the present invention produces particularly excellent effects when used for flue gases from boilers using various oil fuels such as heavy oil, olemulsion, VR and CWM/heavy oil, similar effects can also be obtained when it is applied, for example to coal/heavy oil-fired boilers. Even in exclusive coal-fired boilers, an oil fuel may be burned, for example, at the time of starting or during test runs. The present invention may be effectively applied to such cases.

We claim:

1. A flue gas treating process for treating flue gas comprising $SO_2$ and $SO_3$, comprising:

(A) adding a powder into the flue gas downstream of both an air heater and an electrostatic precipitator to remove $SO_3$ from the flue gas;

(B) subsequently introducing the flue gas into a dust collector, wherein dust and powder present in the flue gas are collected; and (C) subsequently bringing the flue gas into gas-liquid contact with an absorbing fluid, wherein $SO_2$ present in the flue gas is removed by absorption into the absorbing fluid.

2. A flue gas treating process according to claim 1, wherein at least part of the dust collected is reused as the powder added into the flue gas.

3. A flue gas treating process according to claim 1, wherein step (C) is carried out according to the lime-gypsum method, whereby an absorbing fluid having limestone suspended therein as an absorbent is used to form gypsum as a by-product and at least part of the dust collected in step (B) is mixed with the gypsum formed as a by-product in step (C) and discharged out of the system.

4. A flue gas treating process for treating flue gas comprising $SO_2$ and $SO_3$, comprising:

(A) adding a powder into the flue gas downstream of both an air heater and an electrostatic precipitator to remove $SO_3$ from the flue gas;

(B) subsequently recovering heat from the flue gas by means of a heat exchanger, wherein the flue gas is cooled; and (C) subsequently bringing the flue gas into gas-liquid contact with an absorbing fluid, wherein $SO_2$ present in the flue gas is removed by absorption into the absorbing fluid.

5. A flue gas treating process according to claim 4, wherein the powder is dust contained in the combustion exhaust gas of coal.

6. A flue gas treating process according to claim 4, further comprising, subsequent to step (B), introducing the flue gas into a dust collector, wherein dust and powder present in the flue gas are collected.

7. A flue gas treating process according to claim 6, wherein at least part of the collected dust is reused as powder.

8. A flue gas treating process according to claim 6, wherein step (C) is carried out according to the lime-gypsum method, wherein an absorbing fluid having limestone suspended therein as an absorbent is used to form gypsum as a by-product and at least part of the dust collected is mixed with the gypsum formed as a by-product in step (C) and discharged out of the system.

* * * * *